United States Patent [19]
Yun-Ming

[11] Patent Number: 5,715,939
[45] Date of Patent: Feb. 10, 1998

[54] PORTABLE DISK STORAGE BOX FOR HIGH CAPACITY DISKETTES

[76] Inventor: Kwang Yun-Ming, 4F, No. 5, Aly. 35, Ln. 118, Wu-Hsing St., Taipei, Taiwan

[21] Appl. No.: 717,322

[22] Filed: Sep. 20, 1996

[51] Int. Cl.⁶ ............................................. B65D 85/57
[52] U.S. Cl. ............................ 206/308.3; 206/308.1
[58] Field of Search .................... 206/308.3, 387.72, 206/307, 308.1, 309, 312; 312/9.9, 9.11, 9.27, 9.28, 9.41, 9.42, 9.45, 9.58, 9.61

[56] References Cited

U.S. PATENT DOCUMENTS

| | | | |
|---|---|---|---|
| 4,239,108 | 12/1980 | Coleman et al. | 206/308.3 |
| 4,844,260 | 7/1989 | Jaw | 206/308.3 |
| 4,875,743 | 10/1989 | Gelardi et al. | 206/309 |
| 4,998,618 | 3/1991 | Borgions | 206/307 |
| 5,099,995 | 3/1992 | Karakane et al. | 206/309 |
| 5,425,450 | 6/1995 | Lin | 206/308.1 |
| 5,425,451 | 6/1995 | Blase | 206/309 |
| 5,547,078 | 8/1996 | Lida | 206/309 |

*Primary Examiner*—Paul T. Sewell
*Assistant Examiner*—Luan K. Bui
*Attorney, Agent, or Firm*—W Wayne Liauh

[57] ABSTRACT

A portable disk storage box for high capacity diskettes includes a plural number of disk storing cases and a bottom cover. Each disk storing case includes a case body and a case cover. The case body is pivotly engaged with the case cover and turnable for open or close. The case body has protrusive flanges to hold the diskette therein securely. One or more disk cases may be stacked together. The box may thus be flexibly configured to suit different requirements.

1 Claim, 5 Drawing Sheets

PORTABLE DISK STORAGE BOX FOR HIGH CAPACITY DISKETTES

BACKGROUND OF THE INVENTION

1. Field of the Invention

This invention relates to a portable disk storage box for storing high capacity diskettes. It can be flexibly configured to accomodate different number of diskettes into one single assembled portable trait.

2. Description of the Prior Art

Conventional disk storage box is usually composed of a box splitting in two half portions which are connected by a latching means. It usually can only contain a fixed number of disk inside. The latching means gets loose easily and results in disk falling out frequently. The connecting bridge between the two half portions also easily get broken off. As a result, the conventional disk storage box usually has following deficiencies:

1). a fixed box dimension specifically designed for storing fixed number of diskettes.

2). lack of portability and stackability in most cases.

SUMMARY OF THE INVENTION

In view of the aforesaid disadvantages, it is an object of this invention to provide a portable high capacity diskette storage box which can be flexibly configurated to contain one or more diskettes. It is portable and convenient. It is also adjustable to contain one or more diskettes as required.

It is another object of this invention to provide a portable disk storage box which includes a plural number of single disk storing cases and a bottom cover. Each disk storing case includes a case body, a case cover and a circular opening at a corner as a mining axis. Each disk storing case may be turned to open or close about the mining axis. There are protrusive flanges formed on the inside wall of the case body to hold the diskette securely therein. There are also a bulge and a concave slot formed respectively in the case body and in the case cover for snap-locking with each other when the case is close.

Additional advantages of the present invention will be made apparent in the following description having reference to the accompanying drawings. The drawings are only to serve for reference and illustrative purpose, and do not intend to limit the scope of the present invention.

DETAILED DESCRIPTION OF THIS INVENTION

Figure 1:
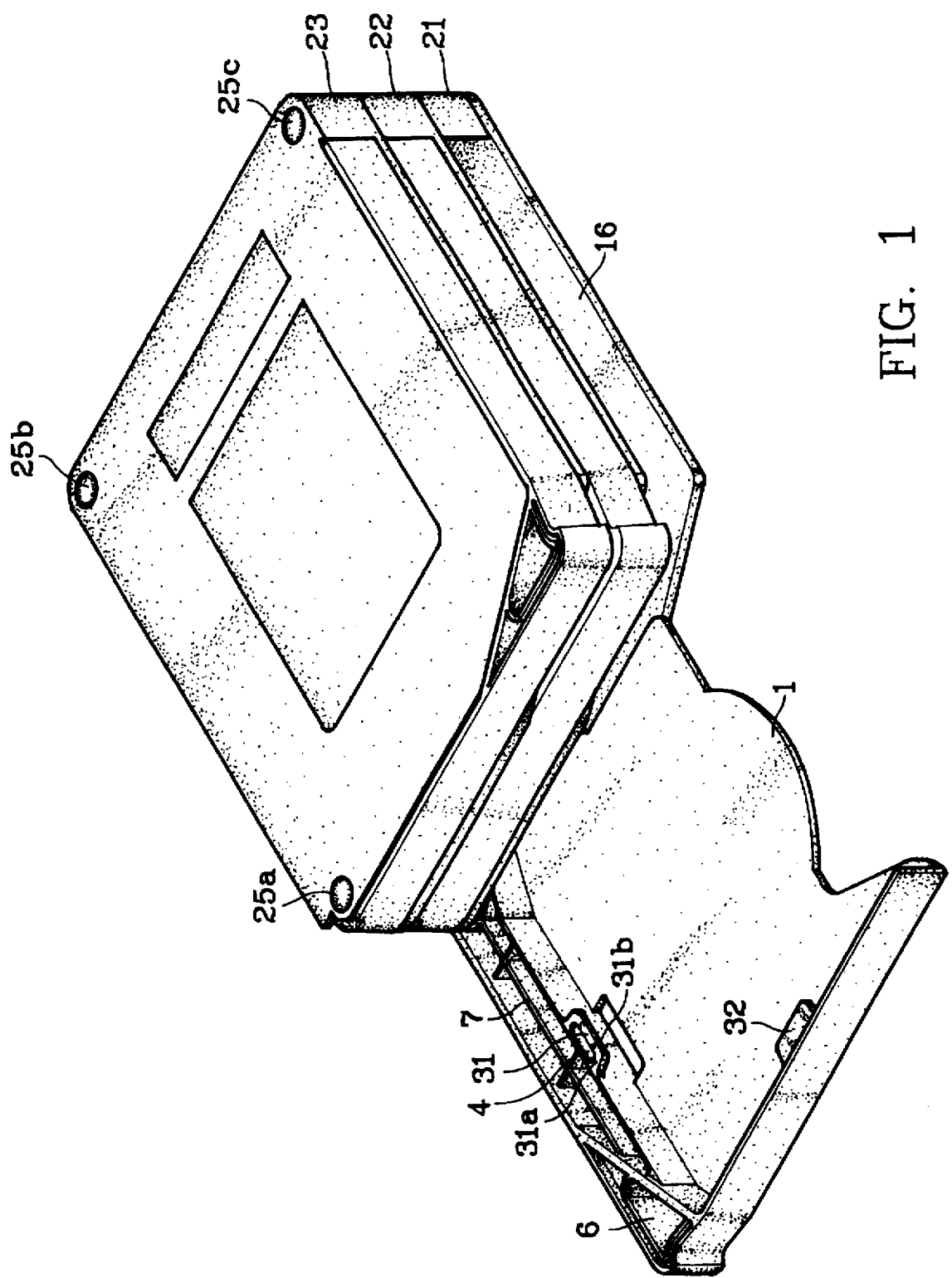
FIG. 1 is a perspective view of this invention.
Figure 3:
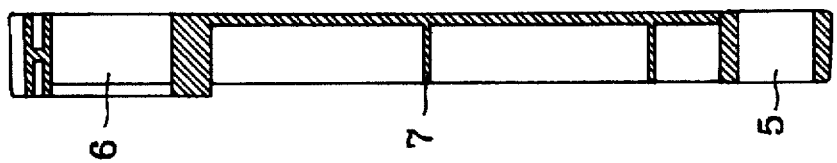
FIG. 3 is a sectional view of a case body.
Figure 8:
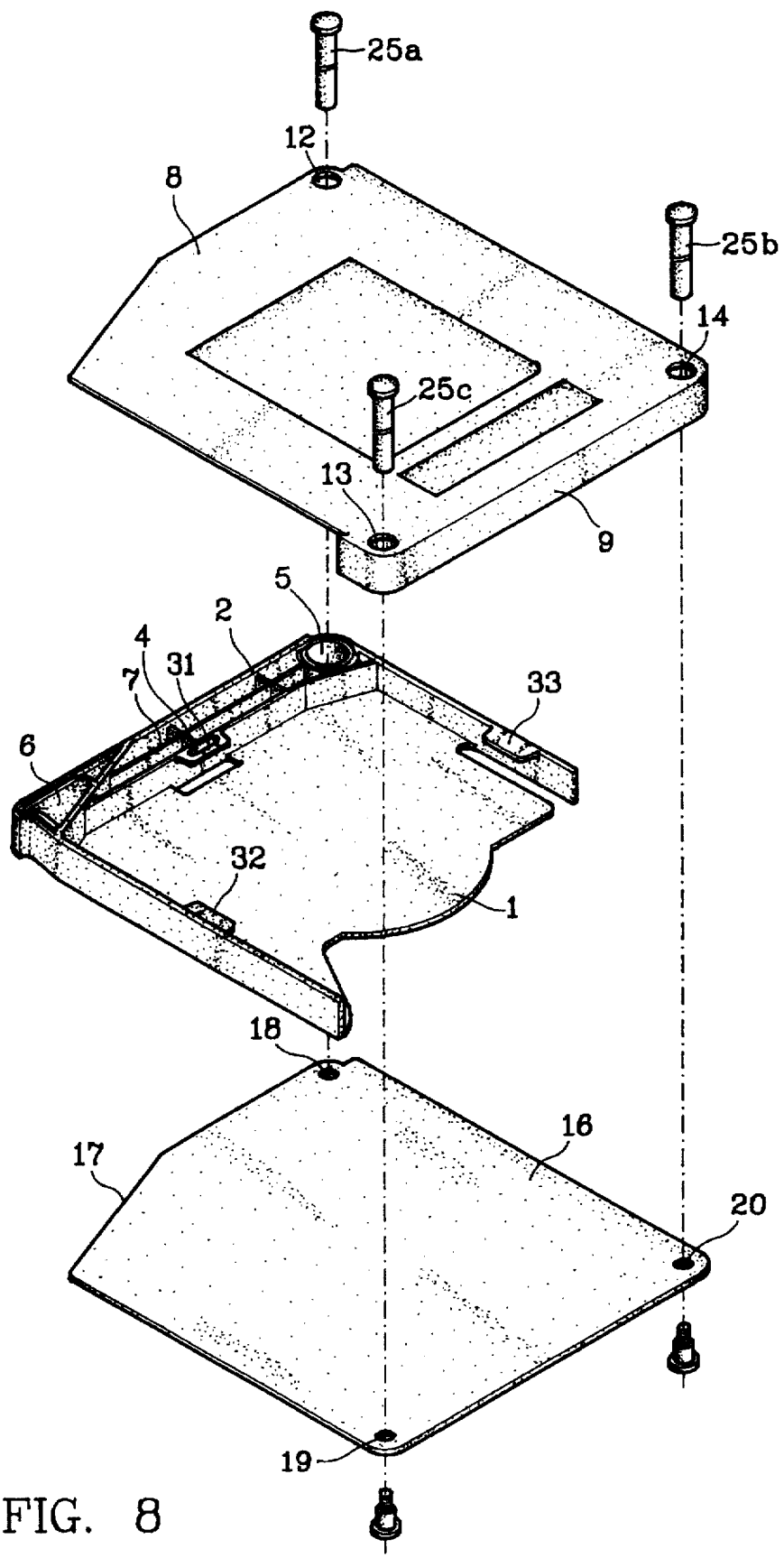
FIG. 8 is an exploded view of this invention.

Referring to FIGS. 1 and 8, this invention includes a plural number of disk storing cases 21, 22, 23 and a bottom cover 16 screwed together by means of bolts 25a, 25b and 25c. Each of disk storing cases 21, 22, 23 includes a case body 1 and a case cover 8 to form a self-contained unit. Instead of three disk storing cases as shown in FIG. 1, this invention allows one or more of disk storing cases to be flexibly assembled and screwed together.

Figure 2:
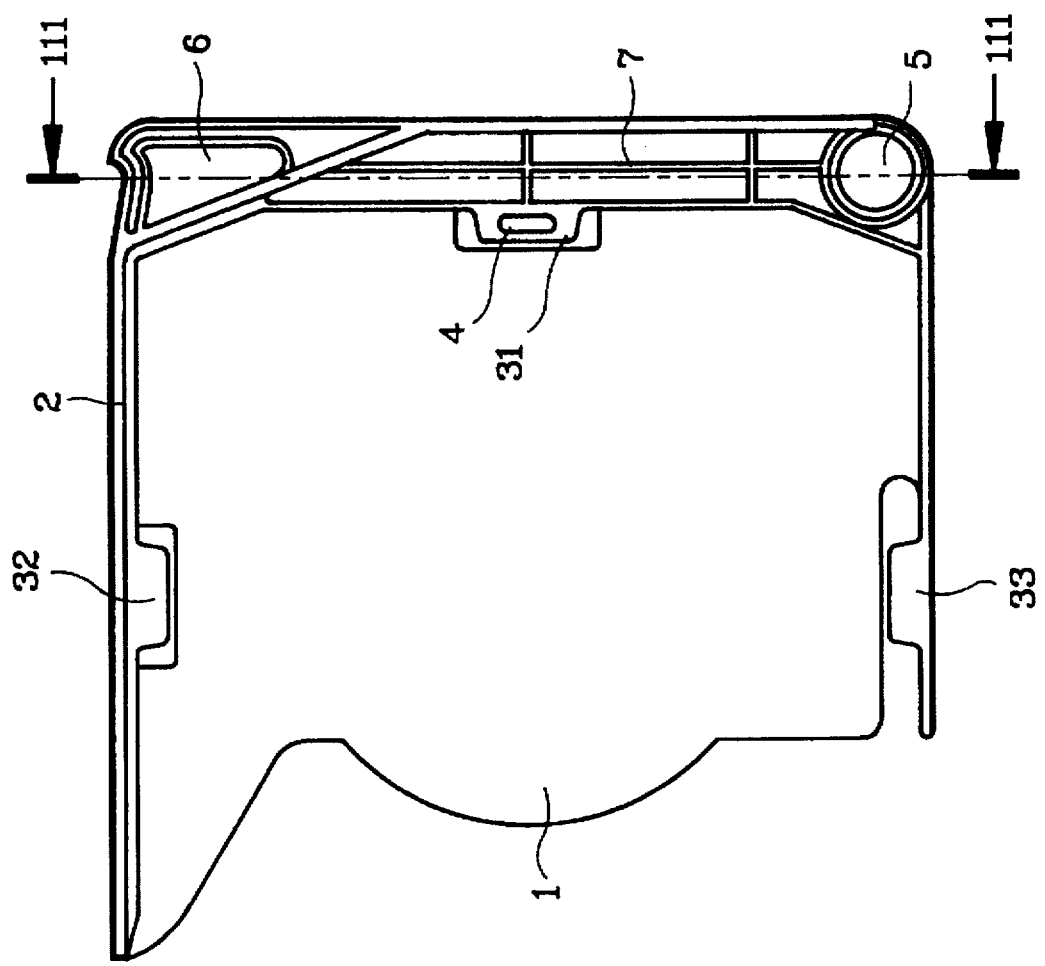
FIG. 2 is a top view of a case body of this invention.

The case body 1 has a first wall 2 around three sides upon which three protrusive flanges 31, 32 and 33 are formed for holding a disk securely thereunder. On the flange 31, there is a bulge 4 formed thereon. At one corner of the case body 1, there is a first circular opening 5. At another corner thereof there is a hollow shape handle 6. There is a rib section which contains a plurality of ribs 7 perpendicular to the case cover 8 located between the circular opening 5 and the handle 6 for improving the mechanical strength of the overall structure (shown in FIGS. 1 and 2).

Figures 4, 5:
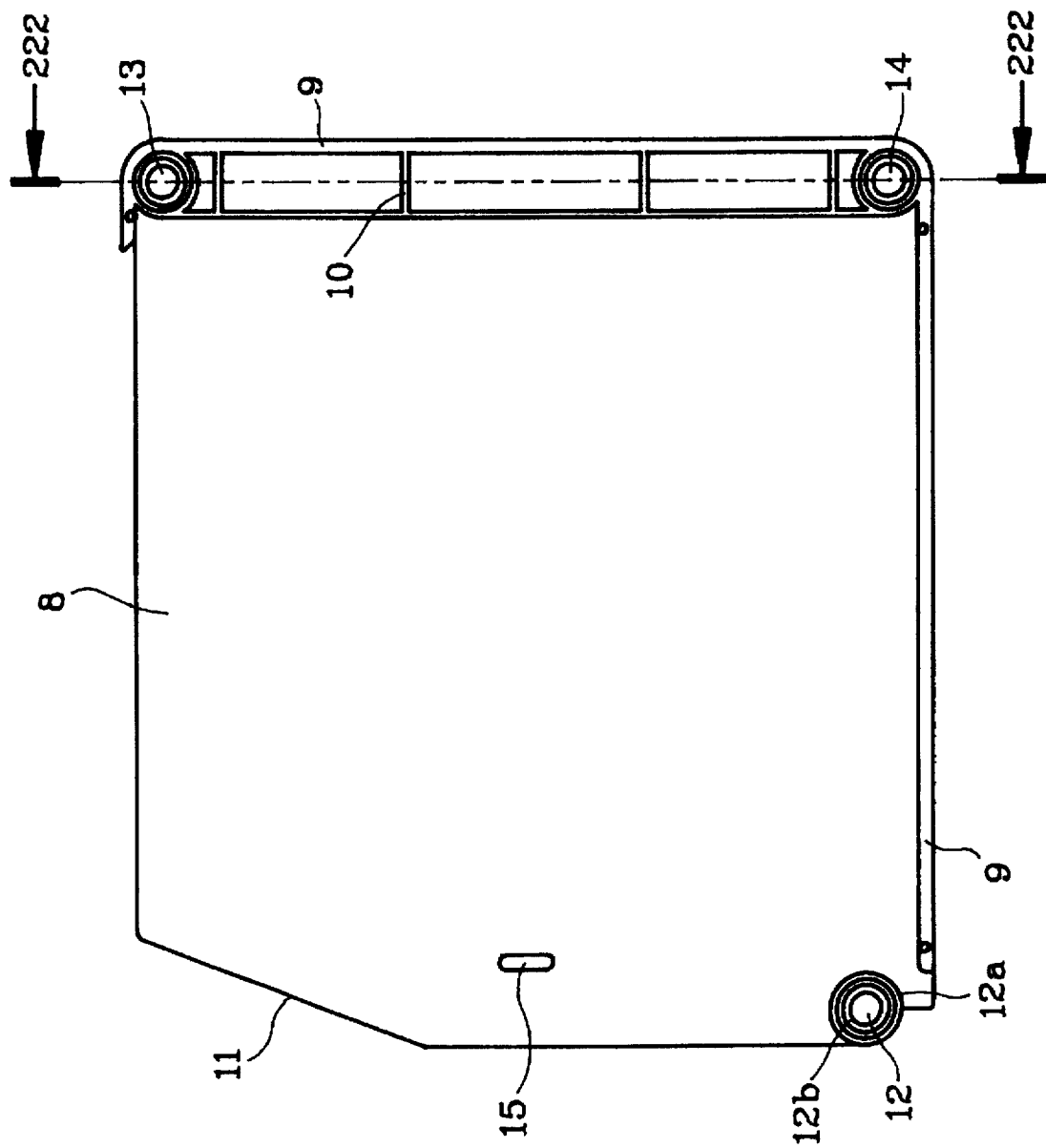
FIG. 4 is a top view of a case cover.
FIG. 5 is a sectional view of a case cover.

Referring to FIGS. 4 and 5, the case cover 8 has two flanges on two adjacent sides. On one flange, there is also another rib section 10 for reinforcing the mechanical strength. At the three corners where the flanges 9 are located, there are a second, a third and a fourth circular openings 12, 13 and 14, whereas the height of the wall of the opening 12, which is provided in the form of a short protruded cylinder is equal to that of the flange 9, and the outside diameter 12a of the opening 12 is equal to the inside diameter of the first opening 5. Thereby the second opening 12 can be pivotly engaged with the first opening 5. At another corner diagonal to the opening 14, it is cut away to form a slant corner to allow the handle 6 of the case body 1 be exposed and become accessible to a user (as shown in FIG. 1). There is a concave slot 15 formed along one edge of the case cover 8 engageable with the bulge 4 on the case body 1.

Figures 6, 7:
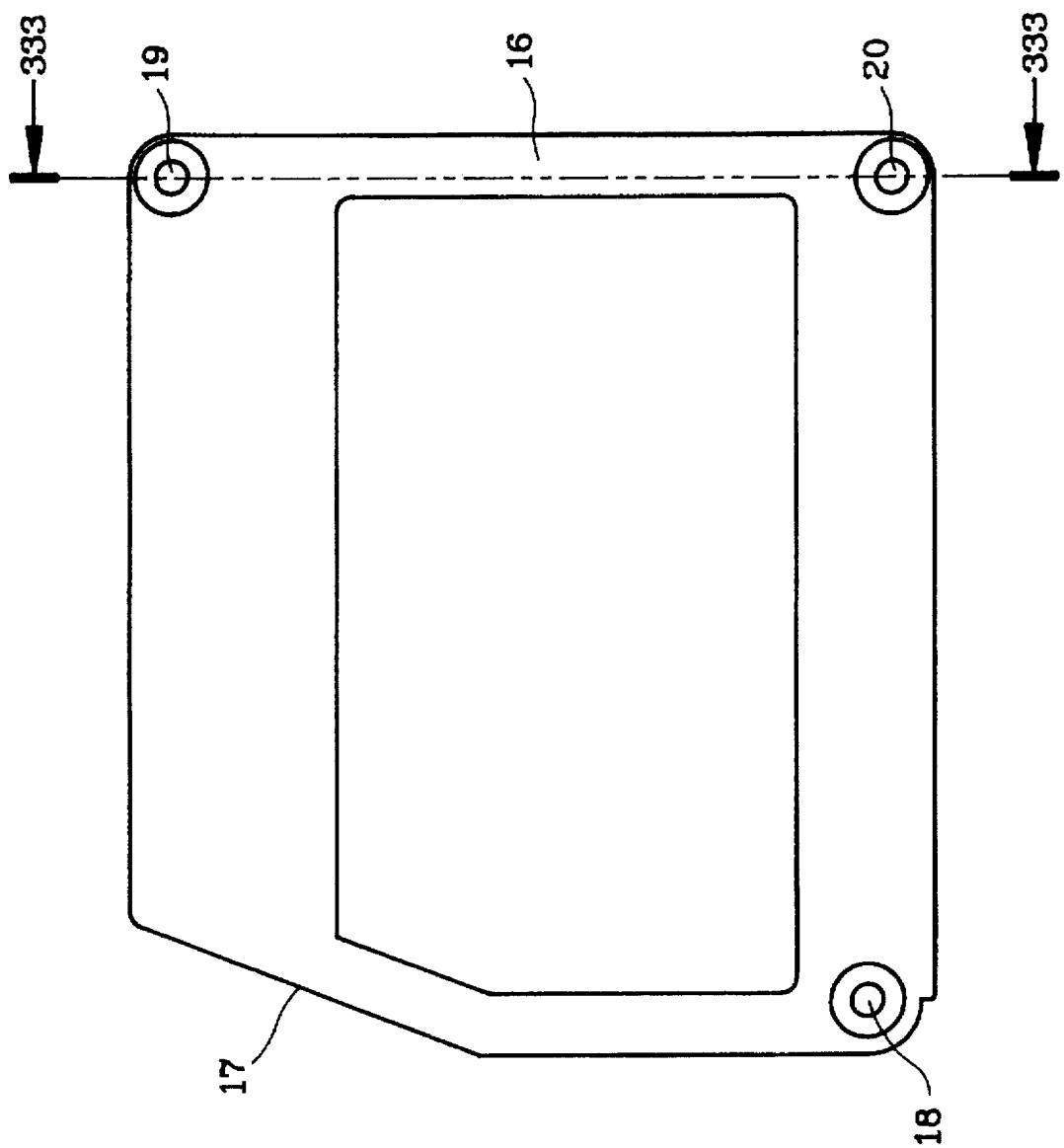
FIG. 6 is a top view of a bottom cover.
FIG. 7 is a sectional view of a bottom cover.

Referring to FIGS. 6 and 7, the bottom cover 16 is a board-shaped substantially like the case cover 11 with a slant corner 17 and three openings 18, 19, 20 located at other three corners.

When in use, a number of the case body 1 and case cover 8 are stacked one over the other as required upon a bottom cover 16 (as shown in FIG. 1). Then screwing the bolt 25a into the openings 12 of the case cover 8, the opening 5 of the case body 1 and the opening 18 of the bottom cover 16. Similarly, the bolt 25b is screwed into the opening 13 and the opening 19, and the bolt 25c is screwed into the opening 14 and the opening 20. When the whole storage box is at close condition (as shown in FIG. 1), the bulge 4 of the case body 1 is engaged with the slot 15 of the case cover. Therefore the diskette held in the case body 1 can be stored therein securely beneath the flanges 31, 32 and 33. When there is a need to open the case body 1 for taking the diskette out or put a disk in, pull the handle 6, then the case body 1 can be turned to open about the pivot axis which is formed by the engaging of openings 5 and 12.

It thus can be seen that this invention may be flexibly configurated to include as many case body 1 and case cover 8 as desired on a bottom cover 17 for containing the diskettes needed. The protrusive flanges in each case body enable a diskette to be held therein securely. The rib structure may reinforce the total strength of the storage box. The bulge and slot allow snap opening or close of a case body without the risk of getting loose. The whole structure is simple for production and easy for use.

What is claimed is:

1. A portable disk storage box for high capacity diskettes comprising:

a plurality of disk storing cases and a bottom cover binded together by a bolt means, wherein each of the disk storing cases contains a case cover and a case body pivotly engaged together through an opening means located respectively at a corner of the case cover and the case body, the case body having a plurality of flanges for holding a high capacity diskette therein, and a handle for opening or closing the case storing body, further wherein:

said opening means comprises a first circular opening provided in the case body and a second circular opening provided in the case cover, said second circular opening being defined by a protruded cylinder which has the same outside diameter as the inside diameter of the first opening so as to allow the protruded cylinder to be pivotably received by the first opening, a first rib section provided between the first circular opening and the handle of the case body, and a second rib section provided on the case cover on a side opposite the first rib section when the case body is closed.

* * * * *